(12) United States Patent
Zhang

(10) Patent No.: US 10,209,523 B1
(45) Date of Patent: Feb. 19, 2019

(54) APPARATUS, SYSTEM, AND METHOD FOR BLUR REDUCTION FOR HEAD-MOUNTED DISPLAYS

(71) Applicant: FACEBOOK TECHNOLOGIES, LLC, Menlo Park, CA (US)

(72) Inventor: Rui Zhang, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/703,939

(22) Filed: Sep. 13, 2017

(51) Int. Cl.
*G02B 27/01* (2006.01)
*G06F 3/01* (2006.01)
*H04N 13/344* (2018.01)

(52) U.S. Cl.
CPC ......... *G02B 27/0172* (2013.01); *G06F 3/013* (2013.01); *H04N 13/344* (2018.05); *G02B 2027/011* (2013.01); *G02B 2027/0118* (2013.01)

(58) Field of Classification Search
CPC .......... G02B 27/0172; G02B 2027/011; G02B 2027/0118; H04N 13/344; G06F 3/013
See application file for complete search history.

(56) References Cited

U.S. PATENT DOCUMENTS

| | | | | |
|---|---|---|---|---|
| 9,582,075 | B2 * | 2/2017 | Luebke | G06F 3/013 |
| 2017/0285735 | A1 * | 10/2017 | Young | G06F 3/013 |
| 2017/0308161 | A1 * | 10/2017 | Richards | G09G 3/003 |
| 2018/0090078 | A1 * | 3/2018 | Chang | G06F 3/013 |

OTHER PUBLICATIONS

Peter Wesley Bristol et al.; Apparatus, System, and Method for Adjusting Head-Mounted-Display Straps; U.S. Appl. No. 15/582,566, filed Apr. 28, 2017.

* cited by examiner

*Primary Examiner* — Abhishek Sarma
(74) *Attorney, Agent, or Firm* — FisherBroyles, LLP

(57) ABSTRACT

An apparatus for reduced display blur may include a display that displays consecutive frames. The apparatus may also include a backlight that intermittently illuminates the display, with variable timing, to render visible each of the consecutive frames. The apparatus may further include a prioritization element that, for each given frame within the consecutive frames, determines a field of interest within the display. The apparatus may additionally include a control element that, for each given frame within the consecutive frames and responsive to the field of interest determined by the prioritization element for the given frame, controls the timing with which the backlight illuminates the display such that the backlight illuminates the display after the display response time has passed for the field of interest within the display for the given frame and finishes illuminating the display before the field of interest within the display is modified for a subsequent frame.

20 Claims, 7 Drawing Sheets

APPARATUS, SYSTEM, AND METHOD FOR BLUR REDUCTION FOR HEAD-MOUNTED DISPLAYS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be display artifacts such as display motion blur.

Display motion blur may arise due to slow pixel response times. Pixels in displays may not change instantaneously when set, but instead may transition over a period of time, during which the appearance of the pixel may not faithfully match the designated color of the pixel. Traditional displays may attempt to reduce display motion blur by turning off a backlight during pixel transitions. However, with this traditional approach, long pixel response times and/or high frame rates may leave insufficient time for turning on the backlight between frames. As a consequence, traditional displays may involve undesirable tradeoffs between frame rates, resolution, and display fidelity.

SUMMARY

The disclosure provided herein describes and illustrates various apparatuses, systems, and methods for the targeted reduction of motion display blur in head-mounted displays. As will be explained in greater detail below, the backlight of a display apparatus may illuminate for each displayed frame when the display response time for pixels within a field of interest has passed (thereby avoiding display artifacts, such as display motion blur, within the field of interest).

In some examples, an apparatus for reduced motion display blur may include a display that displays consecutive frames. The apparatus may also include a backlight that intermittently illuminates the display, with variable timing, to render visible each of the consecutive frames. The apparatus may further include a prioritization element that, for each given frame within the consecutive frames, determines a field of interest within the display. The apparatus may additionally include a control element that, for each given frame within the consecutive frames and responsive to the field of interest determined by the prioritization element for the given frame, controls the timing with which the backlight illuminates the display, such that the backlight illuminates the display after the display response time has passed for the field of interest within the display for the given frame and finishes illuminating the display before the field of interest within the display is modified for a subsequent frame.

In some examples, the backlight may illuminate the display before the display response time has passed for an area of the display outside the field of interest. Additionally or alternatively, the backlight may continue to illuminate the display after an area of the display outside the field of interest is modified for the subsequent frame.

The display may utilize any suitable display technology. In some examples, the display may include a liquid crystal display.

The backlight may be configured to illuminate the display in any suitable manner. In some examples, the backlight may illuminate the entire display simultaneously.

In some examples the apparatus may also include an eye tracking sensor. In these examples, the prioritization element may determine the field of interest within the display based at least in part on an indication from the eye tracking sensor that a user is looking toward the field of interest. In some embodiments, the eye tracking sensor may include a camera.

In additional examples, the prioritization element may determine the field of interest for the given frame based at least in part on detecting a change within the field of interest in the given frame relative to at least one frame sequentially adjacent to the given frame.

In further examples, the prioritization element may determine the field of interest for the given frame based at least in part on metadata indicating that a subject of interest is visually depicted within the field of interest in the given frame.

In some examples, the field of interest for the given frame may include a set of consecutive rows within the given frame.

In various embodiments, the given frame may include a change to the display within the field of interest relative to at least one frame sequentially adjacent to the given frame. In these embodiments, the change to the display within the field of interest may be shown by the display without a substantial display artifact due to the display not being illuminated by the backlight until the display has substantially responded to the change.

A corresponding system for reduced motion display blur may include a display that displays consecutive frames. The system may also include a backlight that intermittently illuminates the display, with variable timing, to render visible each of the consecutive frames. The system may further include a prioritization element that, for each given frame within the consecutive frames determines a field of interest within the display. The system may additionally include a control element that, for each given frame within the consecutive frames and responsive to the field of interest determined by the prioritization element for the given frame, controls the timing with which the backlight illuminates the display, such that the backlight illuminates the display after the display response time has passed for the field of interest within the display for the given frame and finishes illuminating the display before the field of interest within the display is modified for a subsequent frame. In addition, the system may include a head mount coupled to the display that, when worn by a user, holds the display against the user's face.

In some examples, the backlight may illuminate the display before the display response time has passed for an area of the display outside the field of interest. Additionally or alternatively, the backlight may continue to illuminate the display after an area of the display outside the field of interest is modified for the subsequent frame.

The display may utilize any suitable display technology. In some examples, the display may include a liquid crystal display.

The backlight may be configured to illuminate the display in any suitable manner. In some examples, the backlight may illuminate the entire display simultaneously.

In some examples, the system may also include an eye tracking sensor. In these examples, the prioritization element may determine the field of interest within the display based at least in part on an indication from the eye tracking sensor that a user is looking toward the field of interest. In some embodiments, the eye tracking sensor may include a camera.

In additional examples, the prioritization element may determine the field of interest for the given frame based at least in part on detecting a change within the field of interest in the given frame relative to at least one frame sequentially adjacent to the given frame.

In addition to the various apparatuses and systems described herein, the instant disclosure presents exemplary methods associated with reducing motion display blur. For example, a method may include coupling, to a display that displays consecutive frames, a backlight that intermittently illuminates the display, with variable timing, to render visible each of the consecutive frames. The method may also include establishing a communicative connection between the backlight and a prioritization element that, for each given frame within the consecutive frames, determines a field of interest within the display. The method may further include establishing a communicative connection between the backlight and a control element that, for each given frame within the consecutive frames and responsive to the field of interest determined by the prioritization element for the given frame, controls a timing with which the backlight illuminates the display, such that the backlight illuminates the display after a display response time has passed for the field of interest within the display for the given frame and finishes illuminating the display before the field of interest within the display is modified for a subsequent frame. In addition, the method may include coupling a head mount to the display that, when worn by a user, holds the display against the user's face.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
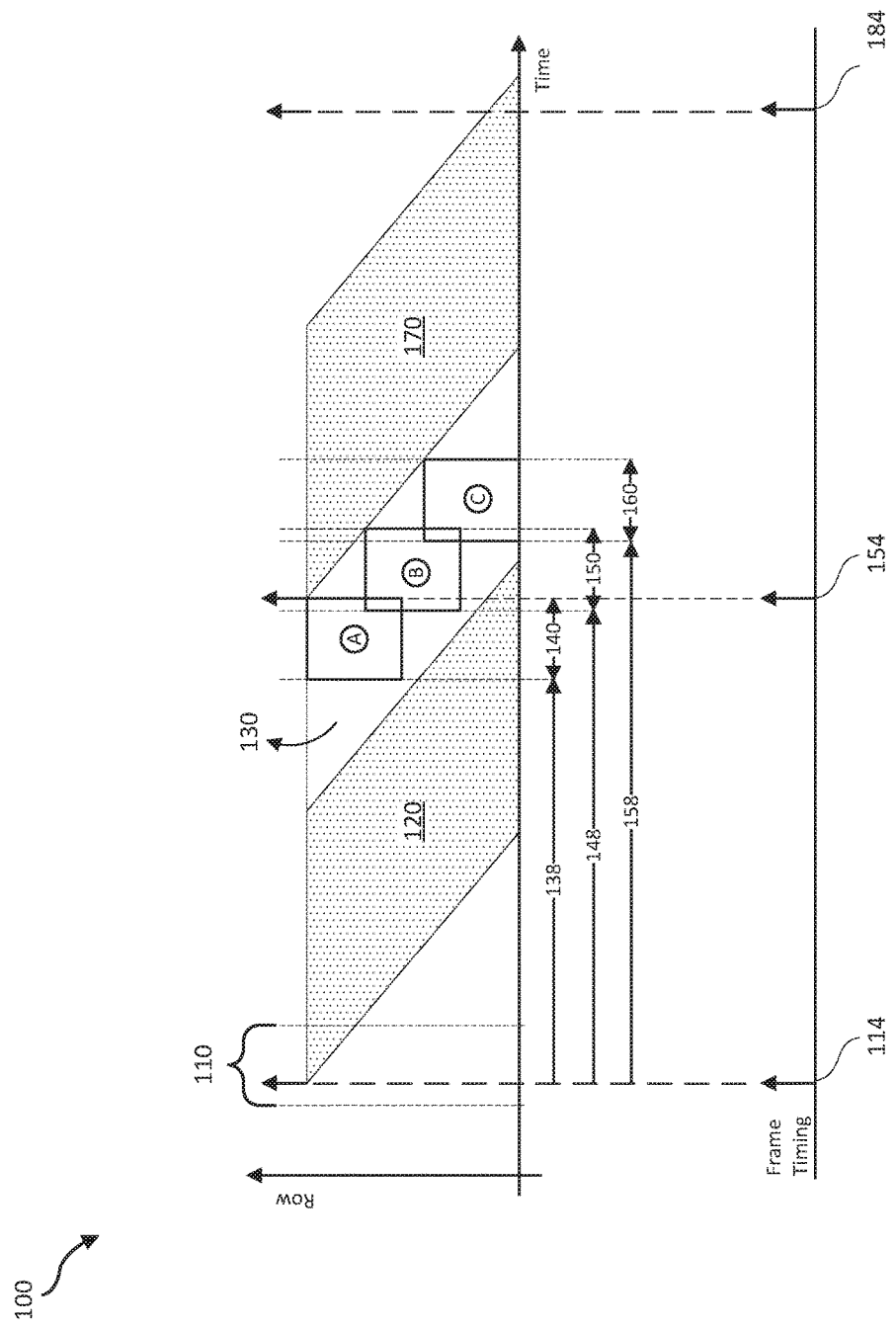
FIG. 1 is a backlight timing diagram for an exemplary display apparatus.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems and methods for the targeted reduction of motion display blur in head-mounted displays. As will be explained in greater detail below, the backlight of a display apparatus may illuminate for each displayed frame when the display response time for pixels within a field of interest has passed (thereby avoiding display artifacts, such as display motion blur, within the field of interest). By selecting backlight timing for each displayed frame to illuminate the display when a field of interest within the frame is stable (and, therefore, will not show display artifacts such as motion blur effects), the systems discussed herein may eliminate motion blur from some frames and/or reduce the noticeability of motion blur (as the motion blur may be contained to areas outside of a user's focus). In addition, by illuminating the backlight even when the display response time for pixels in a frame has yet to pass and/or when pixels in a subsequent frame have been set, the systems described herein may achieve higher frame rates than otherwise. Furthermore, the mechanisms of backlight illumination timing described herein may improve perceived display quality, reduce the tradeoffs involved with display technologies with long pixel response times, and/or reduce display system costs.

The following will provide, with reference to FIG. 1, discussion of backlight illumination timing (e.g., for displays with relatively long pixel response times and/or relatively high framerates). In addition, the discussion associated with FIGS. 2-5 will provide examples of a display apparatus. Furthermore, the discussion associated with FIG. 6 will provide examples of a head-mounted display system. Finally, the discussion associated with FIG. 7 will provide examples of methods for manufacturing, assembling, configuring, and/or using the reduced motion blur display systems presented herein.

FIG. 1 illustrates a display cycle timing 100. As shown in FIG. 1, a display may display a series of frames. For example, consecutive rows of a display may be set (e.g., row-by-row) to display a frame. However, pixels in the display may not immediately display their respective designated colors with full fidelity. Instead, in some examples, pixels may display with fidelity only after a response period has elapsed after setting the pixels. Thus, new frames may be drawn to a display starting at times 114, 154, and 184, respectively; however, the frames may not immediately be ready for viewing, both because of the time it takes to finish drawing all of the rows of each frame and because each drawn row may not display with fidelity until after a response period has elapsed. For example, at time 114, a graphics subsystem may draw a frame, row-by-row, to a display. However, during a response period 120, pixels that were drawn may not yet be fully set. If the display is illuminated during response period 120, changes between the frame drawn at time 114 and an adjacent frame may cause display artifacts, such as motion blur, to appear. Furthermore, as shown in FIG. 1, while the first row of a frame may be drawn at approximately time 114, subsequent rows of the frame may be drawn at later times, meaning that the response period for rows drawn earlier may elapse before the response period for rows drawn later. Following response period 120, the rows of the frame may enter into a settled period 130. If the display is illuminated during settled period 130, artifacts such as a motion blur effect may be absent. A graphics subsystem may draw a subsequent frame to the display starting at time 154. Pixels drawn in the subsequent frame may settle over time during a response period 170.

As may be appreciated by the illustration in FIG. 1, there may be no time between the end of the response period for the last rows drawn in a frame and the first rows drawn in a subsequent frame. For example at time 154, the final rows from the frame drawn to the display starting at time 114 may still be in response period 120 at time 154, when the first rows for the subsequent frame are being drawn. Thus, when a backlight temporarily illuminates the display between frames, at least some rows will be illuminated during a response period for the rows. Even if the first rows for the subsequent frame were not drawn until after response period 120 elapsed for the current frame, there may not be enough time to illuminate the display for a sufficient period while entirely avoiding illuminating any row during response periods 120 and 170.

For example, the backlight may illuminate after a delay 138 subsequent to time 114 and during an illumination period 140. In this case, the top rows of the frame may all be settled during illumination period 140 (e.g., the top rows may fall within settled period 130), but the bottom rows of the frame may still be unsettled (e.g., the bottom rows may still fall within response period 120). As another example, the backlight may illuminate after a delay 148 subsequent to time 114 and during an illumination period 150. In this case, the top rows of the subsequent frame may be drawn (but not yet settled) during the illumination period (e.g., the top rows may fall within response period 170 for the subsequent frame). In addition, the bottom rows of the frame may still be unsettled (e.g., the bottom rows may fall within response period 120). Thus, only the center rows of the frame may be settled. As a third example, the backlight may illuminate after a delay 158 subsequent to time 114 and during an illumination period 160. In this case, the top rows of the subsequent frame may be drawn (but not yet settled) during the illumination period (e.g., the top rows may fall within response period 170 for the subsequent frame), but the bottom rows of the frame may be settled during illumination period 106. Accordingly, following an illumination period 110 (e.g., for a previous frame), the systems described herein may select the next period during which to illuminate the display (e.g., illumination period 140, illumination period 150, illumination period 160, or another period of time starting at some point after response period 120 for the first row of a frame has elapsed and ending at some point before the last row of the next frame is drawn).

As will be explained in greater detail below, in order to determine when to illuminate the backlight, the apparatuses and systems described herein may determine a field of interest for the most recently completed frame and time the illumination of the backlight to illuminate the rows within the field of interest during settled period 130 (even if, e.g., other rows outside the field of interest may be illuminated during response period 120 and/or response period 170). For example, the apparatuses and systems described herein may illuminate the display with the backlight during an illumination period 140 upon determining that an area A is a field of interest, during an illumination period 150 upon determining that an area B is a field of interest, or during an illumination period 160 upon determining that an area C is a field of interest.

The term "display," as used herein, may refer to any type of display for which changes drawn to the display exhibit latency, measured as "response time." In some examples, the display may include a liquid crystal display. In various examples as will be explained in greater detail below, the display may form a part of a head-mounted-display system.

The term "response time," as used herein, generally refers to the amount of time after a change has been drawn to the display for the change to faithfully show in the display. In some examples, the term "response time" may refer to the actual amount of time that a change takes to faithfully show in the display. Additionally or alternatively, the term "response time" may refer to an estimated and/or average amount of time for a change to show in the display (e.g., based on performance measurements and/or projected abilities of the display). In some examples, the term "response time" may refer to the amount of time taken for a change to fully take place. Additionally or alternatively, the term "response time" may refer to the amount of time taken for a change to substantially complete, even if the change has not been fully realized. For example, in some displays a change to a pixel may occur along a gradient (e.g., a black pixel changed to white may gradually pass from black to dark gray to lighter gray to white). Thus, pixel fidelity may increase over time until full fidelity is achieved. In some examples, different changes may exhibit different response times. In these examples, the term "response time" may refer to the latency of the longest change or to the latency of a specific change in question. For example, the apparatuses and systems described herein may determine the response time of a specific row or set of rows based on the extent of changes to the row or rows in question. As used herein references to pixels, rows, and/or images being in a "settled" state may refer to pixels, rows, and/or images for which the response time has passed (and that, therefore, may show a target level of fidelity).

The term "backlight," as used herein, generally refers to any source of illumination that renders the contents of a display (e.g., the image data drawn to the display) visible. In some examples, the backlight may illuminate the entire display simultaneously (instead of, e.g., illuminating pixels on an individual basis or illuminating different regions of the display separately). Nevertheless, in some examples, the backlight may illuminate a specific region of the display. In these examples, the specific region of the display may be regarded as the "display" described herein. Thus, the apparatuses and systems described herein may identify a field of interest within the specific region and select a timing with which to illuminate the specific region of the display such that the field of interest within the specific region is illuminated when pixels within the field of interest have settled.

Figure 2:
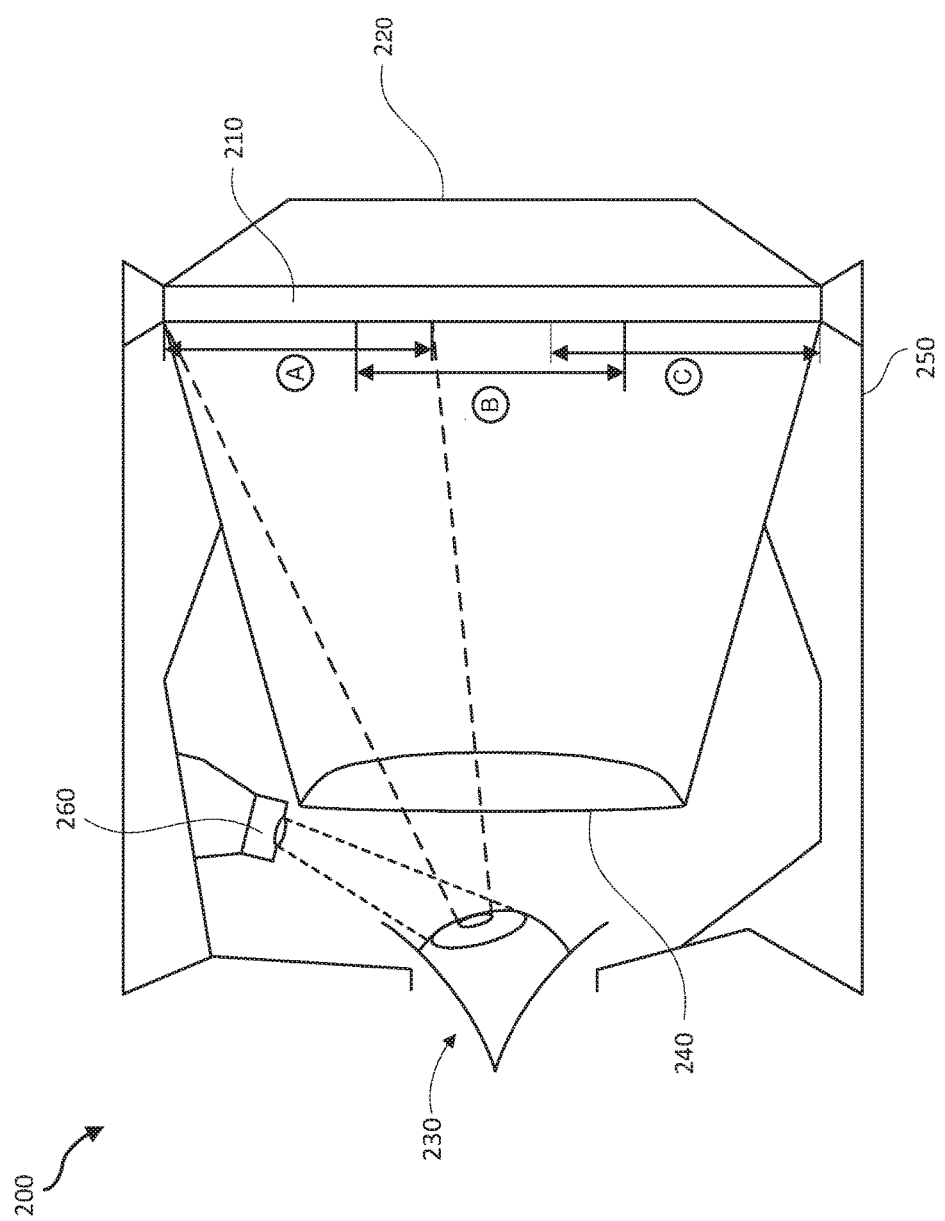
FIG. 2 is an illustration of an exemplary display apparatus in which a user looks at a field of interest at the top of a display.

FIG. 2 illustrates a display apparatus 200. As shown in FIG. 2, apparatus 200 may include a display 210 and a backlight 220 that intermittently illuminates display 210. A user eye 230 may focus on different areas of the display (e.g., an area A, an area B, or an area C). In one example, user eye 230 may view area A of display 210 through a lens 240. In some examples, a case 250 may hold display 210 and/or be worn by the user. Additionally or alternatively, case 250 may block external light, improving the user's view of the display. In one example, an eye sensor 260 (e.g., a camera) may track eye 230 and determine that the user is looking toward area A. Accordingly, a prioritization element may determine (e.g., based on data from eye sensor 260) that area A is a field of interest within display A. As will be explained in greater detail below, the prioritization element may include any of any of a variety of components. In some examples, the prioritization component may receive information originating from and/or form a part of eye sensor 260. A control element may then, based on the determination of the prioritization element, control the timing with which backlight 220 illuminates display 210 such that backlight 220 illuminates display 210 when the field of interest (i.e., area A of the display) is in a settled state. Using FIG. 1 as an example backlight 220 may illuminate display 210 during illumination period 140, when rows within area A have already passed response period 120 into settled period 130 and before the next frame is drawn to rows within area A (e.g., before rows within area A pass into response period 170). Thus, the display within area A may appear clear and accurate to the user (e.g., without motion blur or other display artifacts) while the user focuses on area A.

Figure 3:
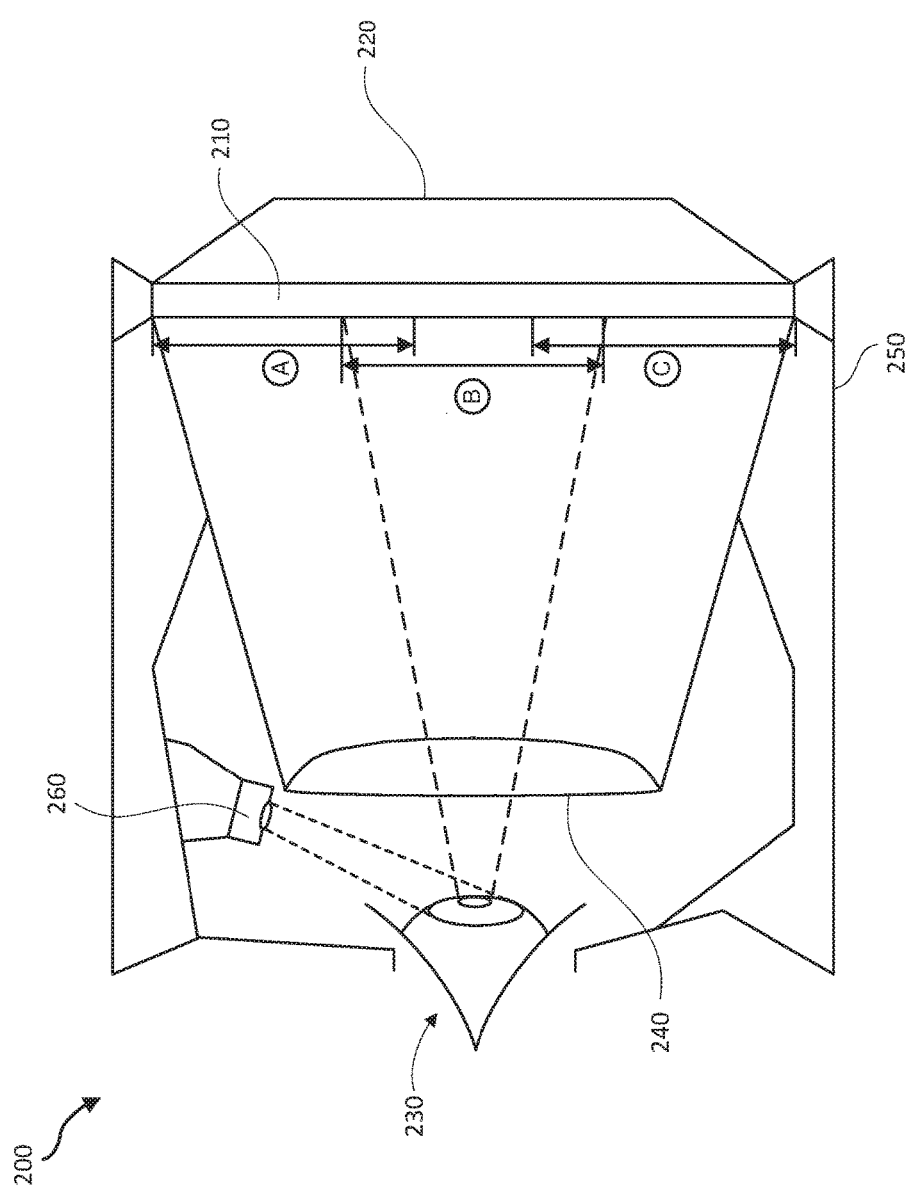
FIG. 3 is an illustration of an exemplary display apparatus in which a user looks at a field of interest around the middle of a display.

FIG. 3 illustrates display apparatus 200 with the user looking at a different part of display 210. As shown in FIG. 2, user eye 230 may view area B of display 210. In one example, eye sensor 260 may track eye 230 and determine that the user is looking toward area B. Accordingly, a prioritization element may determine (e.g., based on data from eye sensor 260) that area B is a field of interest within display 210. A control element may then, based on the determination of the prioritization element, control the timing with which backlight 220 illuminates display 210 such that backlight 220 illuminates display 210 when the field of interest (i.e., area B of the display) is in a settled state. Using FIG. 1 as an example, backlight 220 may illuminate display 210 during illumination period 150, when rows within area B have already passed response period 120 into settled period 130 and before the next frame is drawn to rows within area B (e.g., before rows within area B pass into response period 170). Thus, the display within area B may appear clear and accurate to the user (e.g., without motion blur or other display artifacts).

Figure 4:
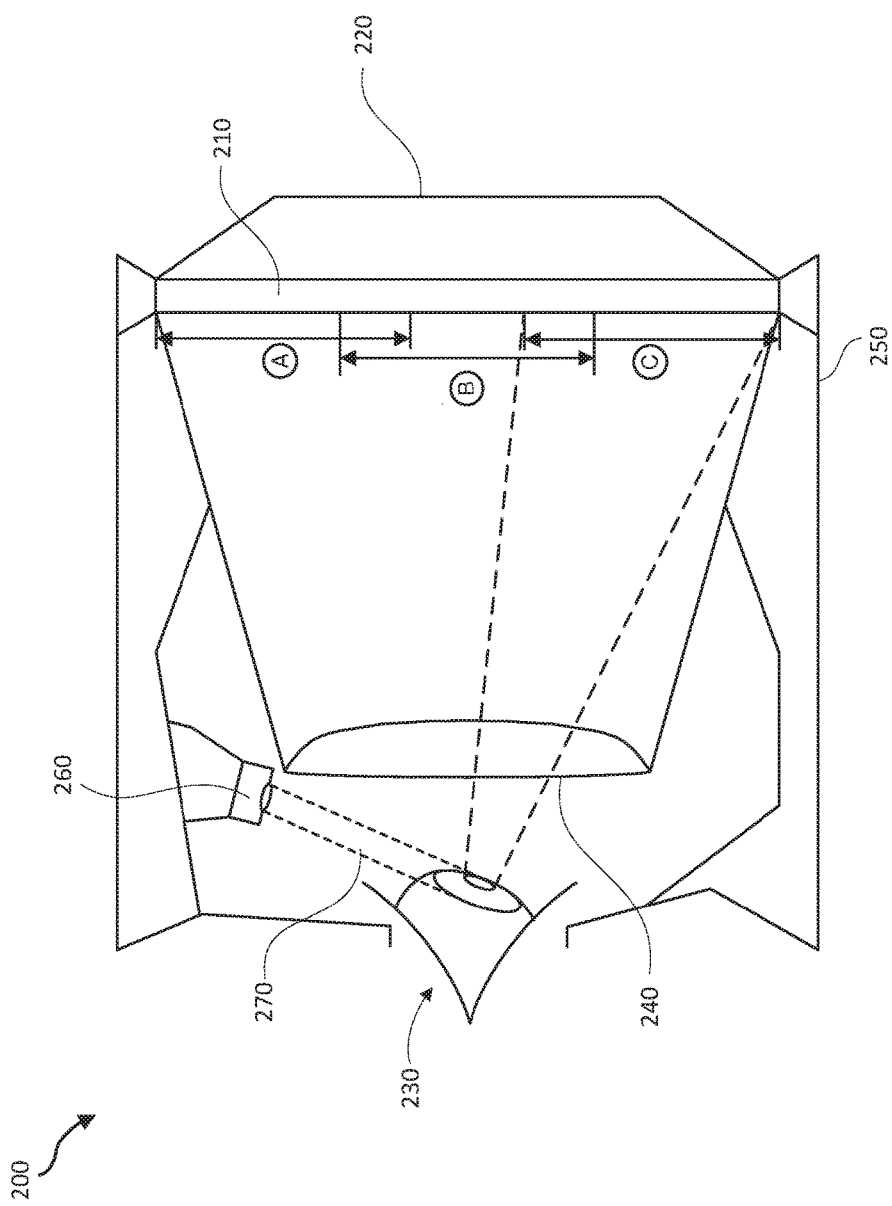
FIG. 4 is an illustration of an exemplary display apparatus in which a user looks at a field of interest at the bottom of a display.

FIG. 4 illustrates display apparatus 200 with the user looking at another part of display 210. As shown in FIG. 2, user eye 230 may view area C of display 210. In one example, eye sensor 260 may track eye 230 and determine that the user is looking toward area C. Accordingly, a prioritization element may determine (e.g., based on data from eye sensor 260) that area C is a field of interest within display 210. A control element may then, based on the determination of the prioritization element, control the timing with which backlight 220 illuminates display 210 such that backlight 220 illuminates display 210 when the field of interest (i.e., area C of the display) is in a settled state. Using FIG. 1 as an example, backlight 220 may illuminate display 210 during illumination period 160, when rows within area C have already passed response period 120 into settled period 130 and before the next frame is drawn to rows within area C (e.g., before rows within area C pass into response period 170). Thus, the display within area C may appear clear and accurate to the user (e.g., without motion blur or other display artifacts).

While the foregoing examples largely discuss three discrete candidate fields of interest (i.e., areas A, B, and C), these areas are used only by way of example. In some examples, the apparatuses and systems described herein may select between a number of discrete candidate fields of interest. In other examples, the apparatuses and systems described herein may calculate a custom field of interest. For example, the apparatuses and systems described herein may define a field of interest by identifying a consecutive series of rows that maximize the amount of motion that falls within the consecutive rows, the amount of user attention paid (or predicted to be paid) to the consecutive rows, the amount of display artifacts expected to be avoided by illuminating the display when the consecutive series of rows are settled, and/or some combination thereof.

In some examples, the apparatuses and systems described herein may eliminate blur by identifying a field of interest which covers all motion occurring between frames. Additionally or alternatively, the apparatuses and systems described herein may greatly reduce the perception of blur by identifying a field of interest on which a user is focused, such that the user will not fully perceive blur outside the field of interest. In some examples the apparatuses and systems described herein may reduce blur for objects portrayed within the display that are designated as important (e.g., for which loss of detail would have a particularly negative impact on usefulness of an application or on a user's sense of immersion).

Figure 5:
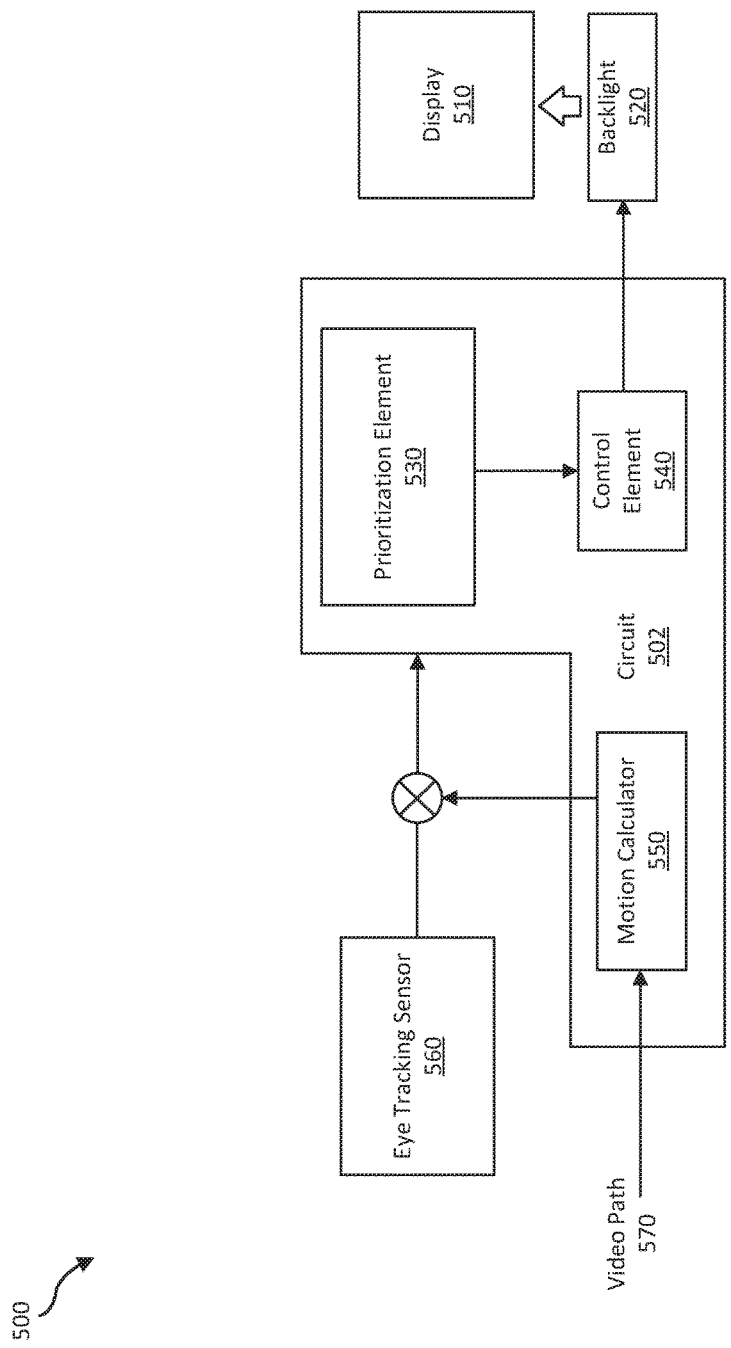
FIG. 5 is a block diagram of an exemplary display apparatus.

FIG. 5 illustrates an exemplary display apparatus 500. As shown in FIG. 5, apparatus 500 may include a display 510 intermittently illuminated by a backlight 520. A circuit 502 may be communicatively connected to backlight 520 to control when backlight 520 illuminates display 510. For example, circuit 502 may include a prioritization element 530 that determines a field of interest within the display for each frame. Circuit 502 may also include a control element 540 that, responsive to the field of interest determined by prioritization element 530 for each frame, controls the timing with which backlight 520 illuminates display 510. For example, circuit 502 may control the timing such that backlight 520 illuminates display 510 after the display response time has passed for the field of interest (e.g., after the display response time has passed for all rows within the field of interest) and finishes illuminating the display before the field of interest within the display is modified for a subsequent frame (e.g., before rows within the field of interest are modified for the subsequent frame).

Prioritization element 530 may determine the field of interest in any of a variety of ways. For example, prioritization element 530 may determine the field of interest based at least in part on an indication from an eye tracking sensor 560 that a user is looking toward the field of interest. The eye tracking sensor may include any of a variety of devices. In some examples, the eye tracking sensor may include a camera. Additionally or alternatively, the eye tracking sensor may include one or more electrodes that sense eye movement via methods of electrooculography. In addition to or as an alternative to relying on eye tracking sensor 560, prioritization element 530 may determine the field of interest based at least in part on an indication from a motion calculator 550 that motion is occurring between frames within the field of interest. For example, a video path 570 may provide input to motion calculator 550. Motion calculator 550 may then analyze the video path 570 to detect motion that occurs between frames. In some examples, motion calculator 550 may select the frame of interest based on determining that the frame of interest maximally covers motion occurring between frames. In some examples, motion calculator 550 and/or prioritization element 530 may receive metadata from an application driving the display (e.g., presentation software, a virtual reality game, etc.) that describes the location, trajectory, and/or relative importance of one or more objects of within the frame. Motion calculator 550 and/or prioritization element 530 may then use the metadata to determine the field of interest. For example, metadata provided by the application to prioritization element 530 may indicate that a key object should be displayed at high fidelity. Prioritization element 530 may then ensure that the field of interest includes the location of the key object. In some examples, prioritization element 530 may determine the field of interest based on multiple factors. For example, prioritization element 530 may calculate scores of candidate fields of interest based on the direction of the user's gaze, motion detected between frames, the degree to which display artifacts may potentially impact the displayed images, metadata designating the importance of key objects and/or regions of the display, and/or any other suitable factors. Prioritization element 530 may then determine the field of interest based on the highest scoring candidate field of interest.

Circuit 502 may represent any suitable circuit for implementing blur reduction. In some examples, circuit 502 may represent a graphics processing unit (GPU) and/or any other type of hardware accelerator designed to optimize graphics processing. Additionally or alternatively, circuit 502 may represent a system on a chip (SOC). As illustrated in FIG. 5, in some examples prioritization element 530 and/or control element 540 may form parts of circuit 502. Additionally or alternatively, prioritization element 530 and/or control element 540 may form parts of eye tracking sensor 560, backlight 520, display 510, and/or other devices with a logic path to backlight 520. In some examples, prioritization element 530 and/or control element 540 may include one or more hardware modules. Additionally or alternatively prioritization element 530 and/or control element 540 may include one or more software modules that perform one or more of the tasks described herein when stored in the memory of a computing device and executed by a hardware processor of a computing device.

Figure 6:
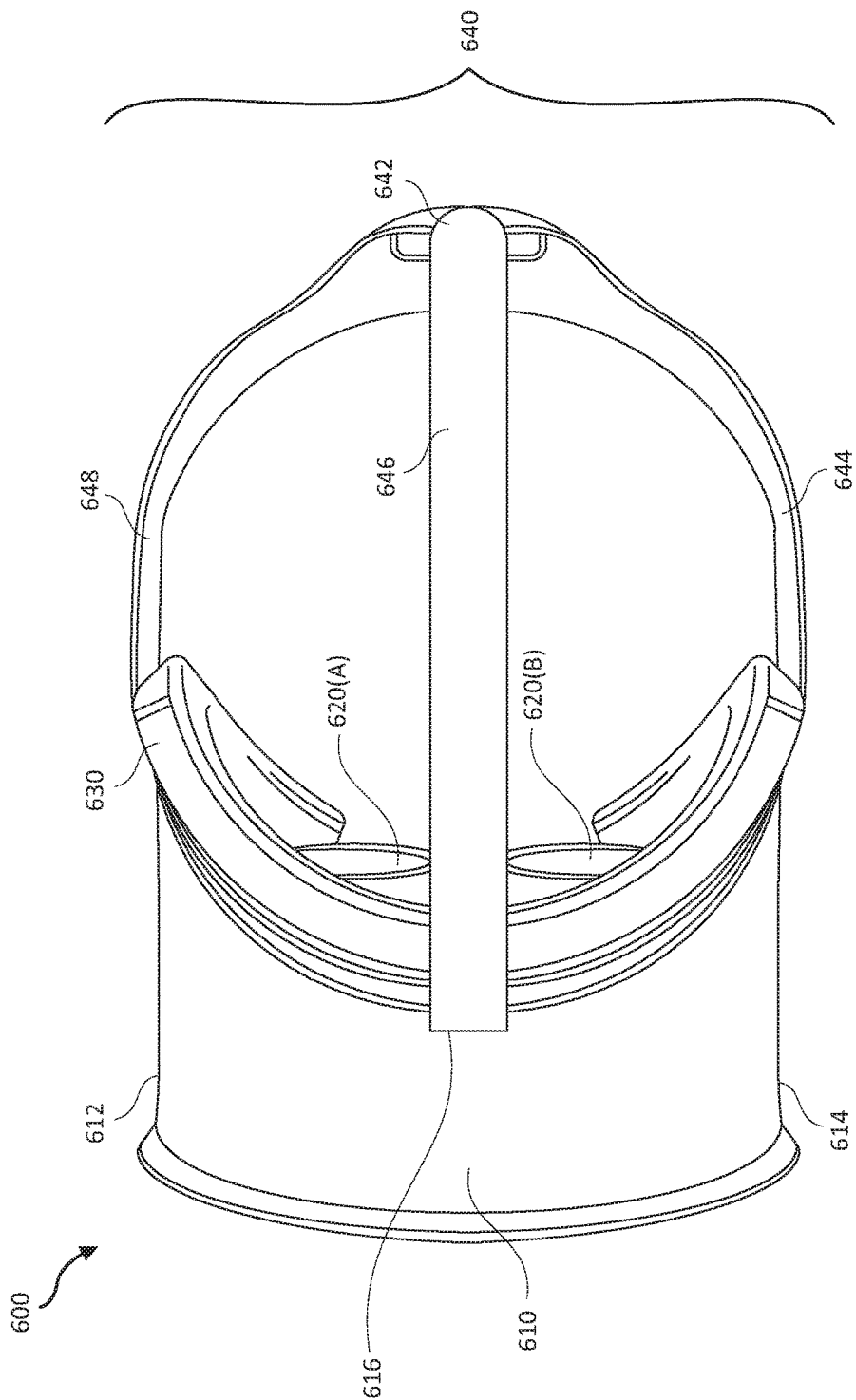
FIG. 6 is a top view of a head-mounted display system.

FIG. 6 is a top view of a head-mounted-display system 600. As shown in FIG. 6, head-mounted-display system 600 may include a head-mounted display 610. Head-mounted display 610 may represent and/or include one or more of the apparatuses discussed herein, such as display apparatus 200 and/or display apparatus 500. Head-mounted display 610 may also include optics 620(A)-(B) and a facial-interface system 630 (e.g., a cushion). Head-mounted display 610 may also be coupled to a strap system 640, which may include a back section 642 that forms a coupling point for a left-side section 644, a top section 646, and a right-side section 648. Left-side section 644 of strap system 640 may be coupled to a left side 614 of head-mounted-display system 600, right-side section 648 may be coupled to a right side 612 of head-mounted-display system 600, and top section 646 may be coupled to a top portion or area 616 of head-mounted display 610.

Figure 7:
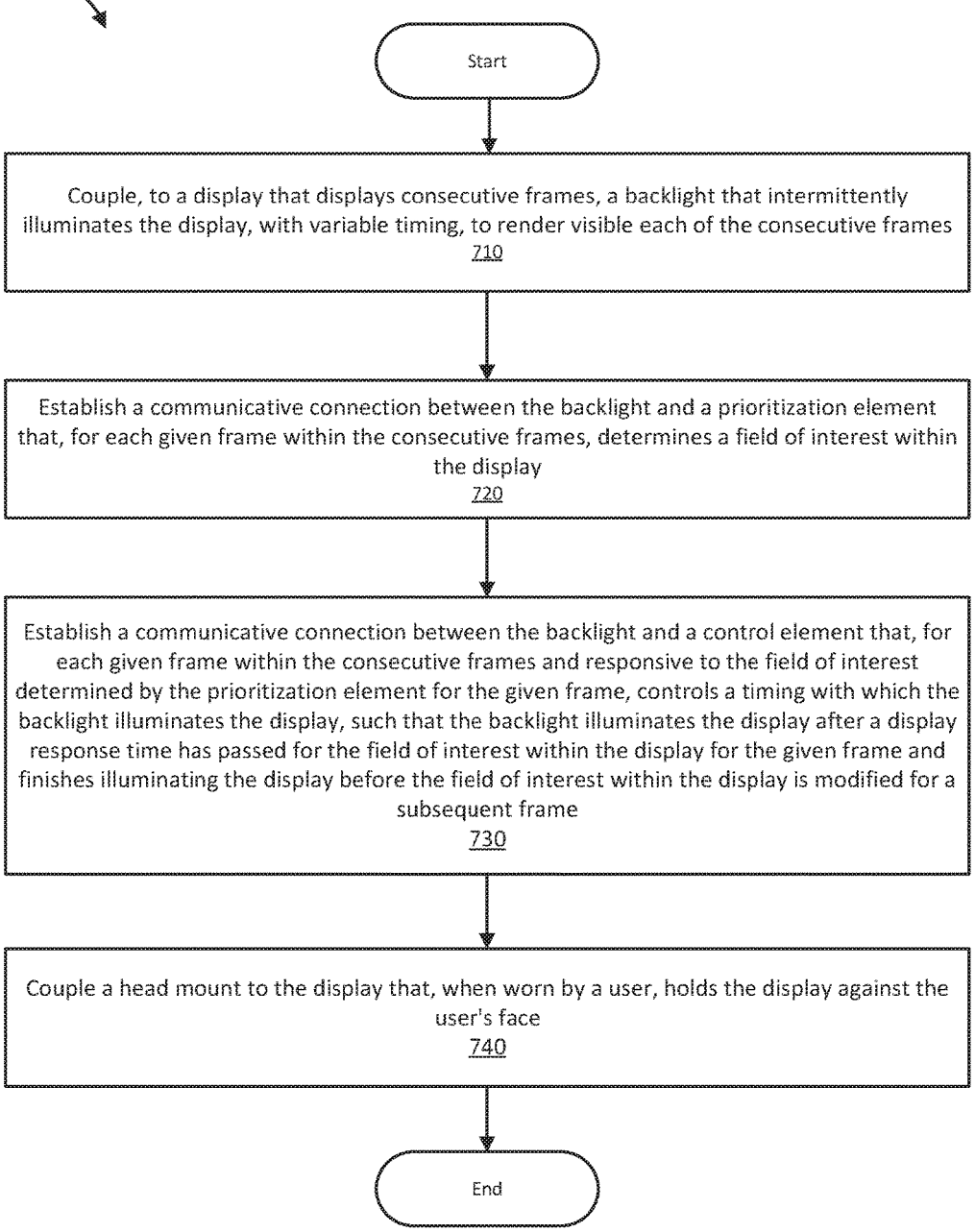
FIG. 7 is a flow diagram of a method for assembling a head-mounted display system with a blur-reducing display apparatus.

FIG. 7 shows a flow diagram of an exemplary method 7 for manufacturing, assembling, and/or configuring one or more of the apparatuses and systems described herein. As shown in FIG. 7, at step 710 a display that shows consecutive frames may be coupled with a backlight that intermittently illuminates the display, with variable timing, to render visible each of the consecutive frames. Using FIG. 2 as an example, backlight 220 may be coupled to display 210. Using FIG. 5 as an example, backlight 520 may be coupled to display 510.

At step 720, a communicative connection between the backlight and a prioritization element may be established. The prioritization element may, for each given frame within the consecutive frames, determine a field of interest within the display. Using FIG. 5 as an example, circuit 502 may be connected (e.g., via a cable that carries digital signals) to backlight 520, thereby establishing a communicative connection between backlight 520 and prioritization element 530 (e.g., via control element 540). In some examples, the communicative connection may be established via wireless communication. For example, prioritization element 530 may be coupled to a wireless transmitter and transmit information that is transformed by control element 540 and relayed to backlight 520.

At step 730, a communicative connection between the backlight and a control element may be established. The control element may, for each given frame within the consecutive frames and responsive to the field of interest determined by the prioritization element for the given frame, control a timing with which the backlight illuminates the display, such that the backlight illuminates the display after a display response time has passed for the field of interest within the display for the given frame and finishes illuminating the display before the field of interest within the display is modified for a subsequent frame. Using FIG. 5 as an example, circuit 502 may be connected (e.g., via a cable that carries digital signals) to backlight 520, thereby establishing a communicative connection between backlight 520 and control element 540. In some examples, the communicative connection may be established via wireless communication. For example, control element 540 may be coupled to a wireless transmitter and control signals via the wireless transmitter to backlight 520.

At step 740, a head mount may be coupled to the display such that, when the head mount s worn by a user, the head mount holds the display to the user's face. Taking FIG. 6 as an example, strap system 640 may be coupled to display 610 (which may represent and/or house display apparatus 200). Thus, strap system 640 may hold display 610 to a user's face and hold optics 620(A) and 620(B) up to the user's eyes.

As described above, a head-mounted display system may include a backlight with adjustable timing. The system may dynamically adjust backlight illumination to ensure that blur caused by unsettled liquid crystals is out of a user's field of interest. The system may illuminate the display when the liquid crystals in the field of interest are settled to reduce the perception of blur. To identify the field of interest, an eye tracking system may detect and/or predict a gaze direction of a user. As another example, an analysis system may identify the field of interest within content being displayed by detecting regions of high change, motion, and/or action within the displayed content.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a display that displays consecutive frames;
a backlight that intermittently illuminates the display, with variable timing to render visible each of the consecutive frames;
a prioritization element that for each given frame within the consecutive frames, determines a field of interest within the display;
a control element that, for each given frame within the consecutive frames and responsive to the field of interest determined by the prioritization element for the given frame, controls a timing with which the backlight illuminates the display, such that the backlight illuminates the display after a display response time has passed for the field of interest within the display for the given frame and finishes illuminating the display before the field of interest within the display is modified for a subsequent frame.

2. The apparatus of claim 1, wherein the backlight illuminates the display before a display response time has passed for an area of the display outside the field of interest.

3. The apparatus of claim 1, wherein the backlight continues to illuminate the display after an area of the display outside the field of interest is modified for the subsequent frame.

4. The apparatus of claim 1, wherein the display comprises a liquid crystal display.

5. The apparatus of claim 1, wherein the backlight illuminates the entire display simultaneously.

6. The apparatus of claim 1, further comprising an eye tracking sensor, wherein the prioritization element determines the field of interest within the display based at least in part on an indication from the eye tracking sensor that a user is looking toward the field of interest.

7. The apparatus of claim 6, wherein the eye tracking sensor comprises a camera.

8. The apparatus of claim 1, wherein the prioritization element determines the field of interest for the given frame based at least in part on detecting a change within the field of interest in the given frame relative to at least one frame sequentially adjacent to the given frame.

9. The apparatus of claim 1, wherein the prioritization element determines the field of interest for the given frame based at least in part on metadata indicating that a subject of interest is visually depicted within the field of interest in the given frame.

10. The apparatus of claim 1, wherein the field of interest for the given frame comprises a set of consecutive rows within the given frame.

11. The apparatus of claim 1, wherein:
the given frame includes a change to the display within the field of interest relative at least one frame sequentially adjacent to the given frame;
the change to the display within the field of interest is shown by the display without a substantial display artifact due to the display not being illuminated by the backlight until the display has substantially responded to the change.

12. A system comprising:
a display that displays consecutive frames;
a backlight that intermittently illuminates the display, with variable timing, to render visible each of the consecutive frames;
a prioritization element that, for each given frame within the consecutive frames, determines a field of interest within the display;
a control element that, for each given frame within the consecutive frames and responsive to the field of interest determined by the prioritization element for the given frame, controls a timing with which the backlight illuminates the display, such that the backlight illuminates the display after a display response time has passed for the field of interest within the display for the given frame and finishes illuminating the display before the field of interest within the display is modified for a subsequent frame;
a head mount coupled to the display that, when worn by a user, holds the display against the user's face.

13. The system of claim 12, wherein the backlight illuminates the display before a display response time has passed for an area of the display outside the field of interest.

14. The system of claim 12, wherein the backlight continues to illuminate the display after an area of the display outside the field of interest is modified for the subsequent frame.

15. The system of claim 12, wherein the display comprises a liquid crystal display.

16. The system of claim 12, wherein the backlight illuminates the entire display simultaneously.

17. The system of claim 12, further comprising an eye tracking sensor, wherein the prioritization element determines the field of interest within the display based at least in part on an indication from the eye tracking sensor that a user is looking toward the field of interest.

18. The system of claim 17, wherein the eye tracking sensor comprises a camera.

19. The system of claim 12, wherein the prioritization element determines the field of interest for the given frame based at least in part on detecting a change within the field of interest in the given frame relative to at least one frame sequentially adjacent to the given frame.

20. A method comprising:
coupling, to a display that displays consecutive frames, a backlight that intermittently illuminates the display, with variable timing to render visible each of the consecutive frames;
establishing a communicative connection between the backlight and a prioritization element that, for each given frame within the consecutive frames, determines a field of interest within the display;
establishing a communicative connection between the backlight and a control element that, for each given frame within the consecutive frames and responsive to the field of interest determined by the prioritization element for the given frame, controls a timing with which the backlight illuminates the display, such that the backlight illuminates the display after a display response time has passed for the field of interest within the display for the given frame and finishes illuminating the display before the field of interest within the display is modified for a subsequent frame;

coupling a head mount to the display that, when worn by a user, holds the display against the user's face.

* * * * *